United States Patent
Takahashi et al.

(10) Patent No.: US 6,782,534 B1
(45) Date of Patent: Aug. 24, 2004

(54) METHOD AND SYSTEM FOR CONTROLLING PROGRAM IN INFORMATION PROCESSING SYSTEM

(75) Inventors: Norio Takahashi, Yokohama (JP); Masao Satoh, Yokohama (JP); Mitsunobu Tasaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 711 days.

(21) Appl. No.: 09/651,097

(22) Filed: Aug. 30, 2000

(30) Foreign Application Priority Data

Aug. 3, 2000 (JP) ...................................... 2000-240363

(51) Int. Cl.$^7$ ................................................ G06F 9/00
(52) U.S. Cl. ..................................... 718/100; 718/101
(58) Field of Search .............................. 709/101, 102, 709/100, 203, 223

(56) References Cited

U.S. PATENT DOCUMENTS

| | | | | |
|---|---|---|---|---|
| 4,918,602 A | * | 4/1990 | Bone et al. ...................... | 705/1 |
| 5,958,004 A | * | 9/1999 | Helland et al. ............. | 709/101 |
| 6,038,587 A | * | 3/2000 | Phillips et al. ............... | 709/101 |

OTHER PUBLICATIONS

D. Platt, "Understanding COM+, The Architecture for Enterprise Development using Microsoft Technologies", Developer Technology Series, Microsoft Press, May 1999, pp. 69–113.
V. Matena, et al "Enterprise JavaBeans Specification, v1.1" Sun Microsystems, Inc., Aug. 1999, pp. 1–308.
CORBA Components—vol. 1: Joint Revised Submission, Object Management Group Inc., Aug. 2, 1999, pp. 1–2 to E450.

* cited by examiner

Primary Examiner—John Follansbee
Assistant Examiner—Ashok B. Patel
(74) Attorney, Agent, or Firm—Antonelli, Terry, Stout & Kraus, LLP

(57) ABSTRACT

A transaction program 120 supplies a container 100 with data 1001 containing transaction identifying information. The container 100 holds an attribute value indicating a component control method corresponding to the transaction identifying information. A transaction determining section 101, an individual process decision section 102 and an attribute value acquisition section 103 are used for acquiring an attribute value corresponding to the transaction. The container 100 carries out a process in accordance with the acquired attribute value.

12 Claims, 9 Drawing Sheets

METHOD AND SYSTEM FOR CONTROLLING PROGRAM IN INFORMATION PROCESSING SYSTEM

BACKGROUND OF THE INVENTION

The present invention relates to a technique for controlling computer programs.

An enterprise information system comprises a plurality of transaction programs for performing transactions such as purchase and remittance peculiar to an enterprise. Each of the transaction programs is generally composed of a plurality of processing steps. A part of the processing steps is common to the plurality of transaction programs. Such a part of the processing steps is separated as a component from each of the transaction programs so that it can be used in common to the plurality of transaction programs.

A technique for using such components generally and efficiently is called "component technique". Use of the component technique permits buying and selling of components as circulating parts. Moreover, such components can be used so efficiently that a plurality of components are generated on a memory in accordance with a request from a transaction program or deleted from the memory automatically when the transaction program need not use the plurality of components. Typical examples of the component technique are an Enterprise Java Beans (EJB) technique, a Common Object Request Broker Architecture Component Model (CCM) technique, and a Component Object Model (COM) technique. The EJB technique is provided by Sun Microsystems Inc. in U.S.A. (see Enterprise Java Beans Specification v1.1, Public Release, Sun Microsystems Inc., Aug. 11, 1999 (Reference 1)). The CCM technique is provided by Object Management Group Inc., a group of standardization in U.S.A. (see CORBA Components—Volume I: Joint Revised Submission, Object Management Group Inc., Aug. 2, 1999 (Reference 2)). The COM technique is provided by Microsoft Corporation in U.S.A. (see Understanding COM+, David S.Platt, Microsoft Press, Jun. 16, 1999, ISBNo. 7356-0666-8 (Reference 3). In the EJB technique, components are called "Enterprise Beans".

One of general characteristics of components is in that the components do not directly use any system program such as transaction service and security service used by transaction programs. In order to provide a component as a more general part, a component provider mounts only a processing logic required to be reused on the component. This is because as follows. The method required for controlling such a system program varies in accordance with the transaction program using the component. Accordingly, if a logic for using the system program is mounted on the component in advance, the transaction allowed to use the component is limited so that general-purpose characteristic is lowered.

The fact that the component does not directly use the system program causes a problem when the transaction program requests the component to use the system program. To solve this problem, a container for controlling the component acts in place of the component to call the system program such as transaction service or security service. The call of the system program is performed as a part of a component controlling process. A plurality of component control methods inclusive of such system program calls are defined by the component technique while attribute values are associated with the plurality of component control methods respectively correspondingly. The container calls the system program property in accordance with the attribute value indicating one of the component control methods.

The classification of the attribute values is defined by each component technique. For example, attribute values concerning transaction control and security management are described in the EJB technique. The following six values are defined as attribute values concerning transaction control. "Not Support-ed": transaction control is not provided. "Required": new transaction is added to start if there is no transaction added when the component is used. "Supported": transaction control is provided. "RequiresNew": new transaction is always added to start when the component is used. "Mandatory": process is terminated abnormally if there is no transaction added when the component is used. "Never": process is terminated abnormally if there is some transaction added when the component is used.

A system constructor can provide a definition file at the time of system construction to give an attribute value indicating a component control method to the container. In the EJB technique, an attribute description format called "Deployment Descriptor" is used for storing an attribute value in a definition file to provide the definition file to the container. Detailed information concerning the Deployment Descriptor is described in chapter 16 "Deployment Descriptor" of the EJB specification (Reference 1).

The way of determining the attribute value indicating a component control method and the process as a result thereof will be described below. FIG. 2 is a data flow chart showing the theory of an enterprise information system constructed by a background art. A container 100 is a program for controlling a component 110. The component 110 is a program to be used by a transaction program 120. The transaction program 120 has data 201 containing a component name (inclusive of the name of a method to be used) corresponding to the component 110 to be used, and a parameter for using the component 110 to be used. An attribute value acquisition section 103 is a program that is used by the container 100 for acquiring an attribute value indicating a component control method. The attribute value acquisition section 103 has table data 210 for holding attribute values correspondingly associated with component names (inclusive of method names). Component name (inclusive of method name)/parameter 2001 is data that is supplied into the container 100 from the transaction program 120 and then supplied from the container 100 into the attribute value acquisition section 103. Component name (inclusive of method name)/parameter/attribute value 2002 is data that is supplied into the container 100 from the attribute value acquisition section 103. Parameter 2003 is data that is supplied into the component 110 from the container 100.

A flow of processing in the background art will be described below. When a system user starts use of a transaction program 120, the transaction program 120 supplies the container 100 with a component name (inclusive of a method name) corresponding to a component 110 to be used and a parameter 210 for using the component 110 to be used. The container 100 receives component name (inclusive of method name)/parameter 2001 and outputs the component name (inclusive of method name)/parameter 2001 into the attribute value acquisition section 103. The attribute value acquisition section 103 acquires an attribute value corresponding to the component name (inclusive of method name) from the table data 210. Then, the attribute value acquisition section 103 outputs component name (inclusive of method name)/parameter/attribute value 2002 into the container 100. The container 100 carries out a process in accordance with the input attribute value. Then, the container 100 outputs parameter 2003 into the component 110 corresponding to the component name. The component 110 receives the parameter 2003 and carries out a process.

The process carried out by the container 100 in accordance with the attribute value is described in detail in Chapter 11 "Support for Transactions" and Chapter 15 "Security Management" of the EJB specification (Reference 1).

SUMMARY OF THE INVENTION

An enterprise information system constructed by use of the aforementioned background art has been used up to now. The needs of using a component in common, however, has increased because the opportunity of processing a large number of transaction programs simultaneously on a system has increased with the advance of improvement in function of the system. If transaction programs use components by generating the components individually on a memory without sharing the components though those components are the same, system resources such as memory, etc. spent by the respective components increase as the number of transaction programs operating on a system increases. As a result, lowering of processing performance is caused due to shortage of system resources. If programs necessary for operating the system as a whole further try to acquire system resources when system resources such as memory, etc. run short, a serious failure such as system down occurs.

In the background art, however, it is impossible to change the attribute value indicating a component control method in accordance with the kind of the transaction. Hence, when there is difference between attribute values to be set by transaction programs needing to use one component in common, a problem is caused so that the component cannot be used in common. Assume now that there are two transaction programs needing to use one component in common and that one of the transaction programs sets the transaction attribute value of the component to "Mandatory". Even in the case where the other transaction program tries to set the attribute value of the component to "Never", the attribute value is disabled from being changed by the transaction program using the component. Hence, even in the case where the transaction program uses the component, the container uses the system program by a method of use corresponding to the attribute value "Mandatory". Incorrect transaction control may cause disappearance of protected data. Incorrect security management may cause stealing of data. If component control is not performed correctly in accordance with the attribute value required of the component, a great deal of loss as described above is given to the enterprise information system user.

An object of the present invention is to provide a program control method and system in which the attribute value used for component control can be changed in accordance with the kind of the transaction.

The foregoing object of the present invention can be achieved by a program control method comprising the steps of: holding transaction identifying information for identifying a transaction to be executed by a transaction program, a component name for specifying a component to receive data from the transaction program and an attribute value indicating a method for controlling the component while correspondingly associating them with one another; inputting data containing component name, parameter to be sent to a component corresponding to the component name and transaction identifying information; and controlling the component corresponding to the input component name on the basis of the input transaction identifying information and the held attribute value corresponding to the input component name to thereby output the input parameter into the component. Hence, the attribute value used for component control can be changed in accordance with the kind of the transaction.

DESCRIPTION OF THE EMBODIMENTS

Embodiments of the present invention will be described below in detail with reference to the drawings.

The theory of the present invention will be described on the basis of a first embodiment thereof.

Figure 1:
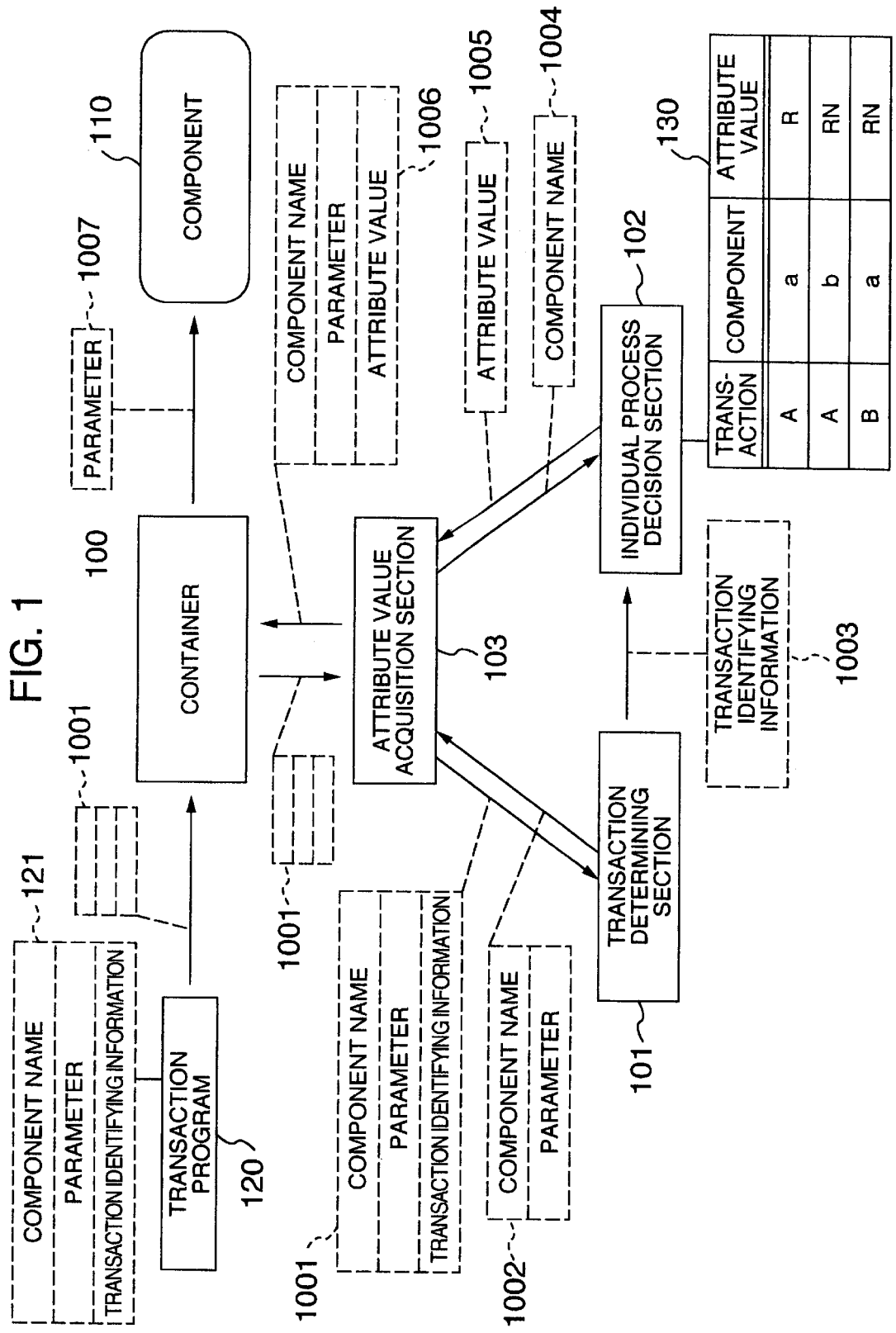
FIG. 1 is a data flow chart showing the theory of a first embodiment of the present invention.
Figure 2:
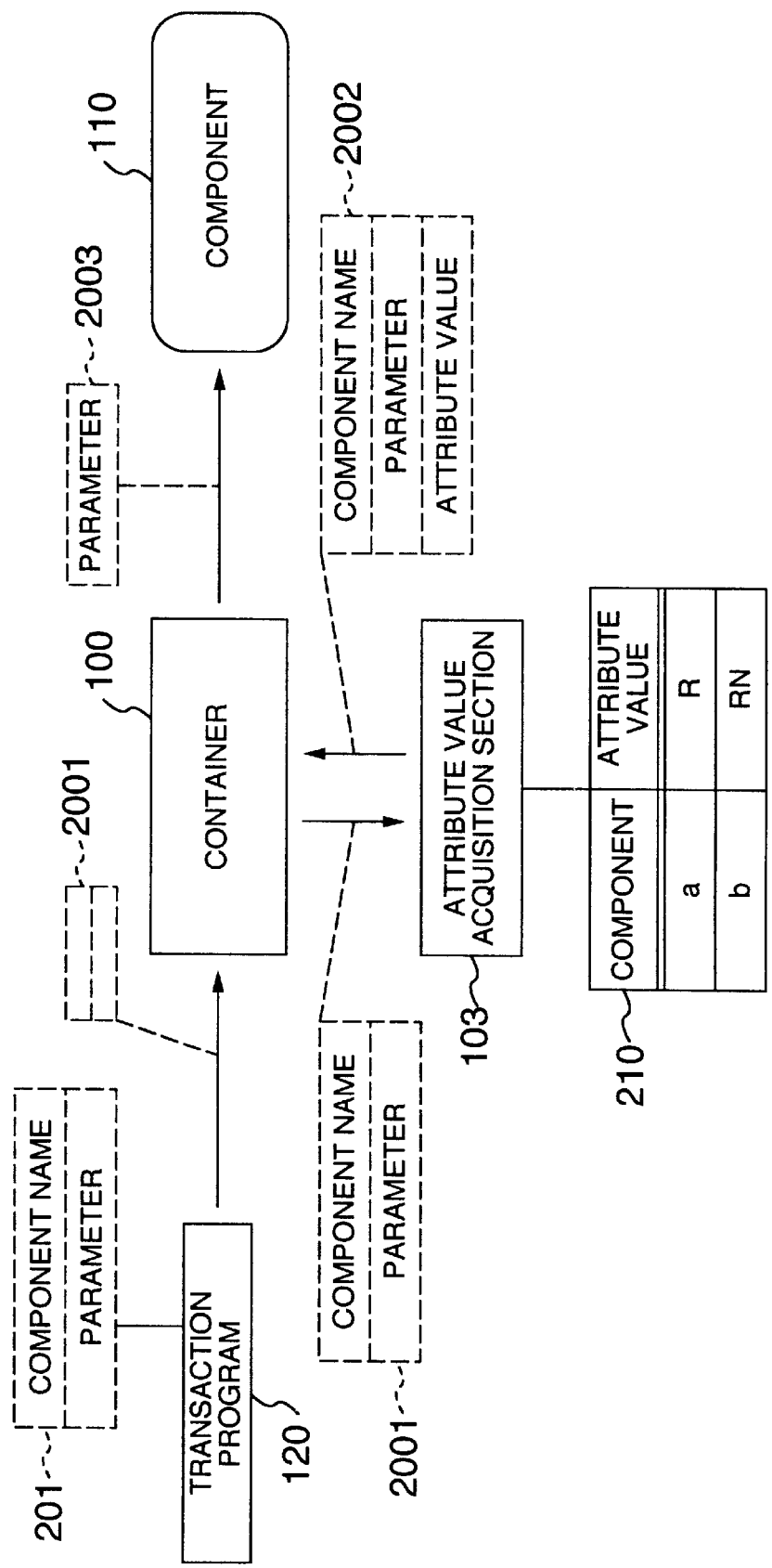
FIG. 2 is a data flow chart showing the theory of a background art.

FIG. 1 is a data flow chart showing the theory of an enterprise information system according to the first embodiment. A container 100 is a program for controlling a component 110. The component 110 is a program to be used by a transaction program 120. The transaction program 120 is a program for performing a transaction in the enterprise information system. The transaction program 120 has data 121 that contains a component name (inclusive of the name of a method to be used) corresponding to the component 110 to be used, a parameter for using the component 110 and transaction identifying information for identifying a transaction to be executed by the transaction program. An individual process decision section 102 is a program for deciding an attribute value indicating a component control method in accordance with the transaction identifying information and the component name. The individual process decision section 102 has table data 130 having records each containing a field for holding the transaction identifying information, a field for holding the component name, and a field for holding the attribute value. The attribute value acquisition section 103 is a program that is used by the container 100 for acquiring the attribute value. Component name/parameter/transaction identifying information 1001 is data that is supplied into the container 100 from the transaction program 120, supplied from the container 100 into the attribute value acquisition section 103, and then supplied from the attribute value acquisition section 103 into the transaction determining section 101. Component name/parameter 1002 is data supplied into the attribute value acquisition section 103 from the transaction determining section 101. Transaction identifying information 1003 is data supplied into the individual process decision section 102 from the transaction determining section 101. Component name 1004 is data supplied into the individual process decision section 102 from the attribute value acquisition section 103. Attribute value 1005 is data supplied into the attribute value acquisition section 103 from the individual process decision section 102. Component name/parameter/ attribute value 1006 is data supplied into the container 100 from the attribute value acquisition section 103. Parameter 1007 is data supplied into the component 110 from the container 100.

A flow of processing in the first embodiment will be described below. When a system user starts use of a transaction program 120, the transaction program 120 supplies a container 100 with data containing a component name (inclusive of a method name) corresponding to a component 110 to be used, a parameter for using the component 110 and transaction identifying information for identifying a transaction to be executed by the transaction program 120. The container 100 outputs component name/parameter/ transaction identifying information 1001 into the attribute value acquisition section 103. The attribute value acquisition section 103 acquires an attribute value indicating a component control method by using the transaction determining section 101 and the individual process decision section 102. The attribute value acquisition section 103 outputs component name/parameter/attribute value 1006 into the container 100. The container 100 carries out a process in accordance with the input attribute value. Then, the container 100 outputs parameter 1007 into the component 110 corresponding to the component name. Upon reception of the parameter 1007, the component 110 carries out a process.

Figure 3:
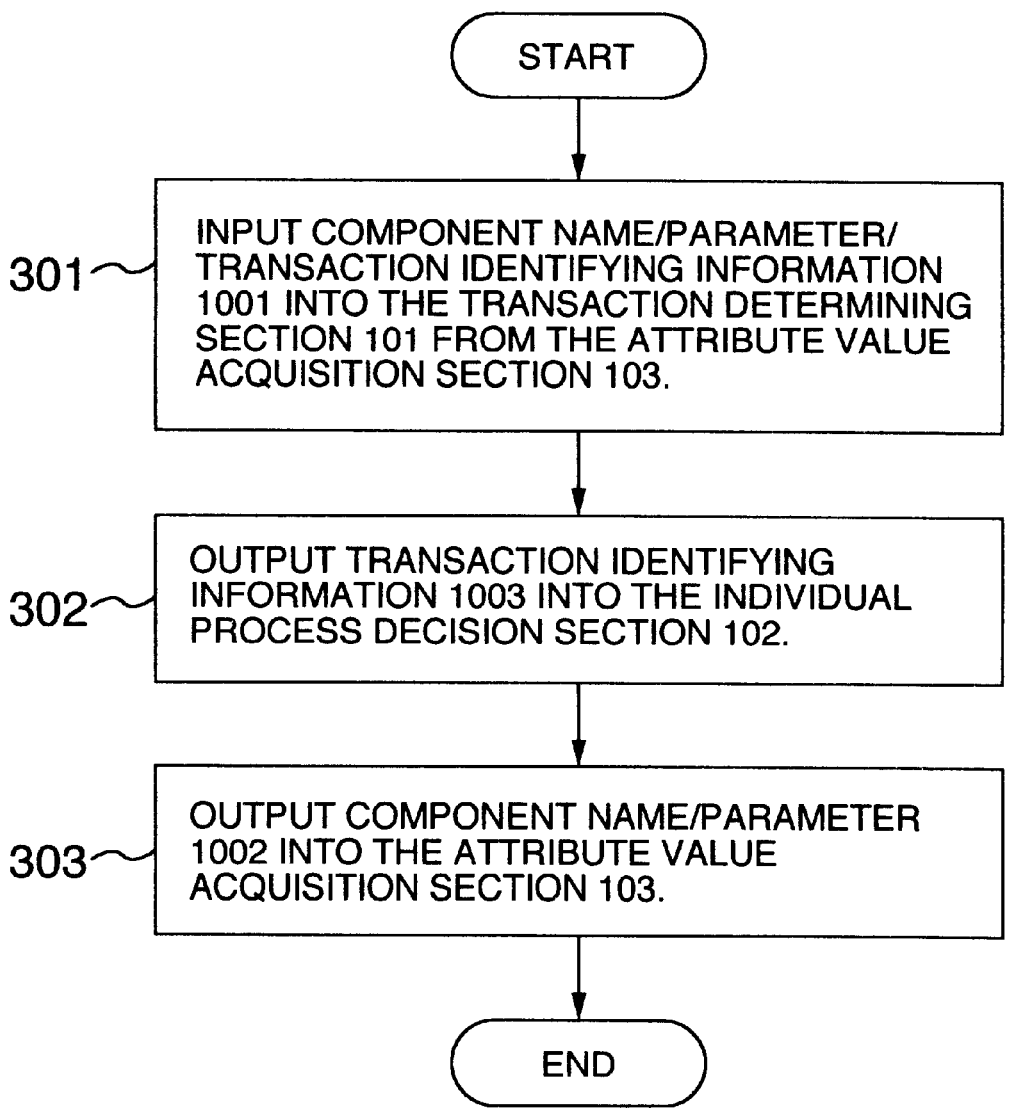
FIG. 3 is a flow chart showing a flow of processing in the transaction determining section in the first embodiment.

FIG. 3 shows a flow of processing in the transaction determining section 101. The transaction determining section 101 carries out a process through steps 301 to 303. The step 301 is a step in which the transaction determining section 101 receives component name/parameter/transaction identifying information 1001 from the attribute value acquisition section 103. The step 302 is a step in which the transaction determining section 101 supplies transaction identifying information 1003 to the individual process decision section 102. The step 303 is a step in which the transaction determining section 101 supplies component name/parameter 1002 to the attribute value acquisition section 103.

Figure 4:
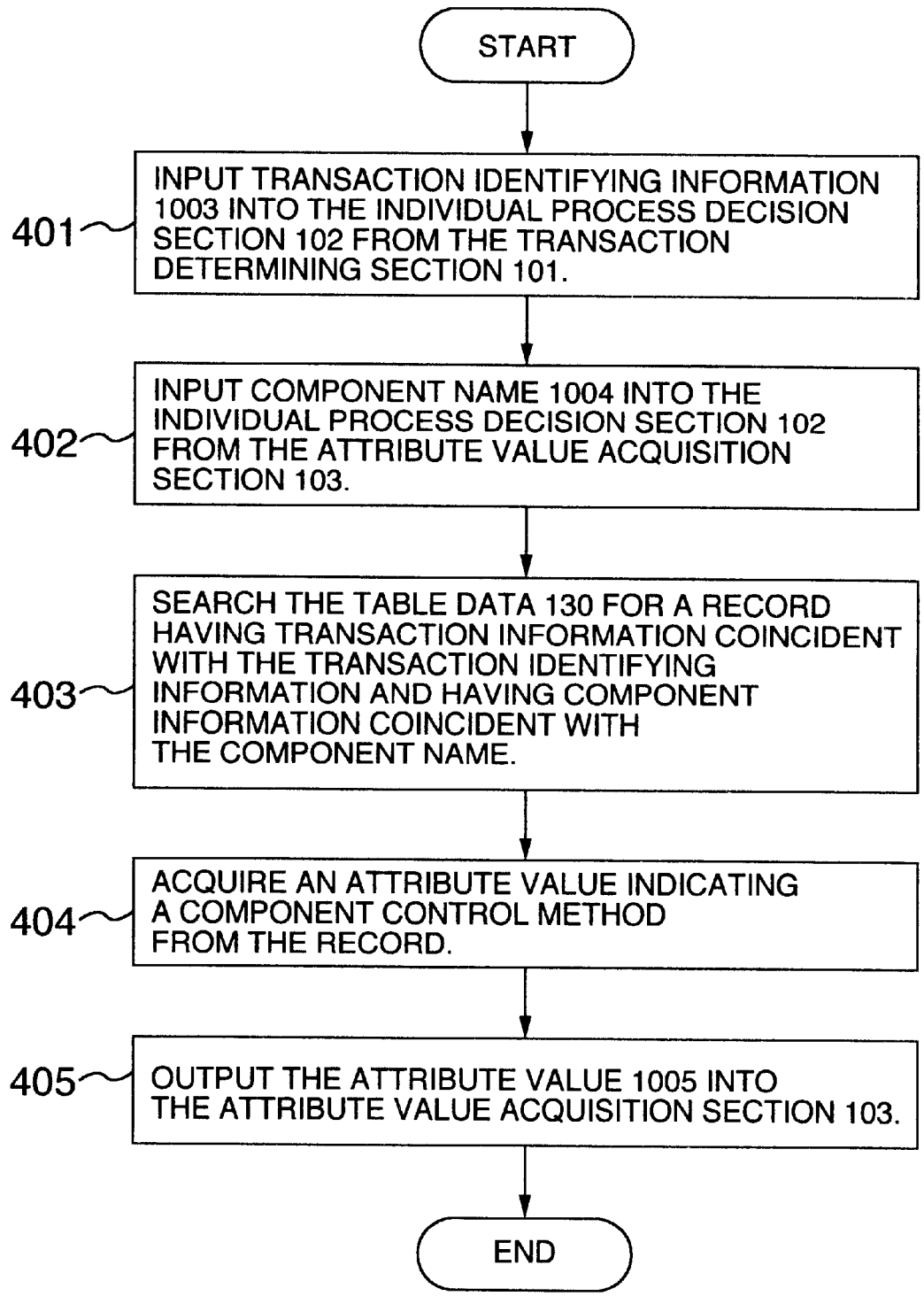
FIG. 4 is a flow chart showing a flow of processing in the individual process decision section in the first embodiment.

FIG. 4 shows a flow of processing in the individual process decision section 102. The individual process decision section 102 carries out a process through steps 401 to 405. The step 401 is a step in which the individual process decision section 102 receives transaction identifying information 1003 from the transaction determining section 101. The step 402 is a step in which the individual process decision section 102 receives component name 1004 from the attribute value acquisition section 103. The step 403 is a step for searching the table data 130 for a record having transaction information coincident with the transaction identifying information and having component information coincident with the component name. The step 404 is a step for acquiring an attribute value indicating a component control method from the record. The step 405 is a step in which the individual process decision section 102 supplies the attribute value 1005 to the attribute value acquisition section 103.

Figure 5:
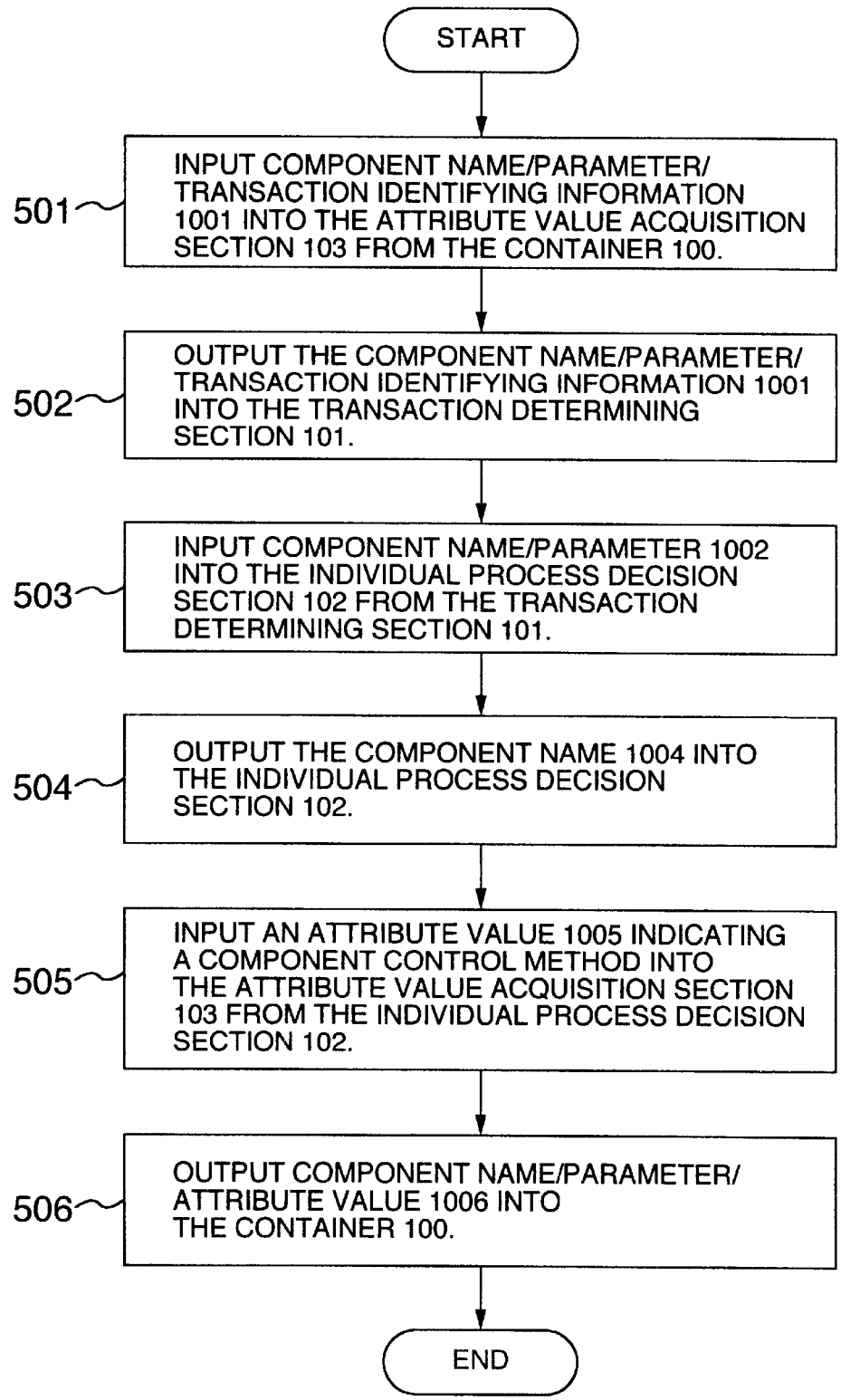
FIG. 5 is a flow chart showing a flow of processing in the attribute value acquisition section in the first embodiment.

FIG. 5 shows a flow of processing in the attribute value acquisition section 103. The attribute value acquisition section 103 carries out a process through steps 501 to 506. The step 501 is a step in which the attribute value acquisition section 103 receives component name/parameter/transaction identifying information 1001 from the container 100. The step 502 is a step in which the attribute value acquisition section 103 supplies the component name/parameter/ transaction identifying information 1001 to the transaction determining section 101. The step 503 is a step in which the attribute value acquisition section 103 receives component name/parameter 1002 from the transaction determining section 101. The step 504 is a step in which the attribute value acquisition section 103 supplies the component name 1004 to the individual process decision section 102. The step 505 is a step in which the attribute value acquisition section 103 receives an attribute value 1005 indicating a component control method from the individual process decision section 102. The step 506 is a step in which the attribute value acquisition section 103 supplies component name/ parameter/attribute value 1006 to the container 100.

By the aforementioned processing, the attribute value indicating the method for controlling the component 110 can be changed in accordance with the transaction identifying information supplies from the transaction program 120. Because transaction control and security management can be performed in accordance with the attribute value corresponding to the transaction, one component can be used in common to transaction programs requiring different attribute values respectively.

The case where the present invention is applied to an enterprise information system will be described in detail on the basis of a second embodiment of the present invention.

Figure 6:
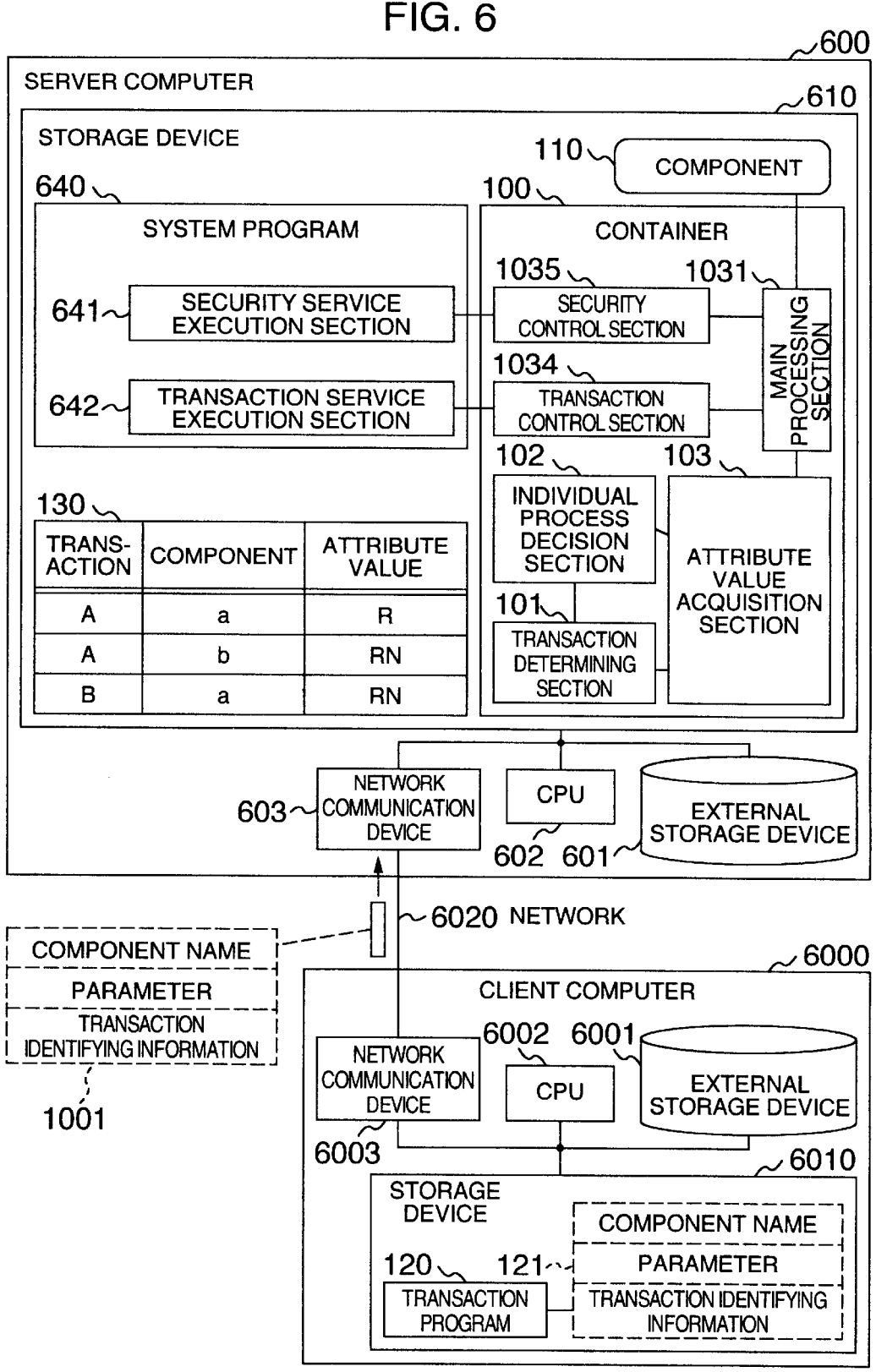
FIG. 6 is a diagram showing the detailed configuration of a second embodiment of the present invention.

FIG. 6 is a diagram showing the detailed configuration of an enterprise information system according to the second embodiment.

A server computer 600 includes an external storage device 601, a CPU 602, a network communication device 603, and a storage device 610. The external storage device 601 is a device such as a magnetic disk device, an optical disk device, a magneto-optical disk device, etc. The external storage device 601, the CPU 602, the network communication device 603 and the storage device 610 are connected to one another. The network communication device 603 is further connected to a client computer 6000 through a network 6020.

The storage device 610 has a container 100, a component 110, table data 130 and a system program 640. The container 100 is a program for controlling the component 110. The component 110 is a program to be used by a transaction program 120. The system program 640 is a program for providing service such as transaction control, security management, etc. required of the transaction program.

The container 100 has a transaction determining section 101, an individual process decision section 102, an attribute value acquisition section 103, a main processing section 1031, a transaction control section 1034, and a security control section 1035. The transaction determining section 101 is a program for acquiring transaction identifying information for identifying a transaction. The individual process decision section 102 decides an attribute value indicating a component control method corresponding to the transaction identifying information and the component name. The individual process decision section 102 has table data 130 having records each containing a field for holding the transaction identifying information, a field for holding the component name, and a field for holding the attribute value. The attribute value acquisition section 103 is a program that is used by the container 100 for acquiring the attribute value. The main processing section 1031 is a program that performs main processing in the container 100 and that performs controlling of the component 110 through the steps of:

supplying the component 110 with data received from the transaction program 120; acquiring the attribute value indicating a method for controlling the component 110 from the attribute value acquisition section 103; and supplying the attribute value into the transaction control section 1034 and the security control section 1035. The transaction control section 1034 is a program for performing transaction control by calling a transaction service execution section 642 in accordance with the attribute value. The security control section 1035 is a program for performing security management by calling a security service execution section 641 in accordance with the attribute value. The system program 640 has the security service execution section 641 and the transaction service execution section 642. The security service execution section 641 is a program for performing security management. The transaction service execution section 642 is a program for performing transaction control.

The client computer 6000 includes an external storage device 6001, a CPU 6002, a network communication device 6003, and a storage device 6010. The external storage device 6001 is a device such as a magnetic disk device, an optical disk device, a magneto-optical disk device, etc. The external storage device 6001, the CPU 6002, the network communication device 6003 and the storage device 6010 are connected to one another. The storage device 6010 has a transaction program 120, and data 121. The data 121 contains a component name (inclusive of the name of a method to be used) corresponding to the component 110, a parameter for using the component 110, and transaction identifying information for identifying a transaction to be executed by the transaction program. As a specific form of this embodiment, one and the same computer may serve as the client computer 6000 and the server computer 600.

The data 1001 containing a component name, a parameter and transaction identifying information is data supplied to the container 100 by the transaction program 120 in order to use the component 110. A flow of processing in the second embodiment will be described below. When a system user starts use of a transaction program 120 in the client computer 6000, the transaction program 120 supplies the network communication device 6003 with data 121 containing a component name (inclusive of a method name) corresponding to the component 110 to be used, a parameter for using the component 110 and transaction identifying information for identifying a transaction to be executed by the transaction program. The network communications device 6003 supplies data 1001 containing the data 121 to the network communication device 603 through the network 6020. The main processing section 1031 of the container 100 receives the data 1001 from the network communication device 603 and supplies the data 1001 to the attribute value acquisition section 103. The attribute value acquisition section 103 acquires an attribute value indicating a component control method by using the transaction determining section 101 and the individual process decision section 102. The way of acquiring the attribute value is the same as that in the first embodiment. The attribute value acquisition section 103 supplies component name/parameter/attribute value to the main processing section 1031. When the attribute value contains an attribute value concerning transaction control, the main processing section 1031 supplies the attribute value concerning transaction control to the transaction control section 1034. The transaction control section 1034 performs transaction control by using the transaction service execution section 642 in accordance with the input attribute value. Then, when the attribute value contains an attribute value concerning security management, the main processing section 1031 supplies the attribute value concerning security management to the security control section 1035. The security control section 1035 performs security management by using the security service execution section 641 in accordance with the input attribute value. Further, the parameter is supplied to the component 110 corresponding to the component name. Upon reception of the parameter, the component 110 carries out a process.

As described above, in the case where the present invention is applied to an enterprise information system, the attribute value indicating a method for controlling the component 110 can be changed in accordance with the transaction identifying information output from the transaction program 120. Because transaction control and security management can be performed in accordance with the attribute value corresponding to the transaction, one component can be used in common to transaction programs requiring different attribute values respectively.

A method for supplying the container with data containing transaction identifying information for identifying a transaction to be executed by a transaction program and an attribute value indicating a component control method corresponding to the name of a component to be used by the transaction program will be described in detail on the basis of a third embodiment of the present invention.

Figure 7:
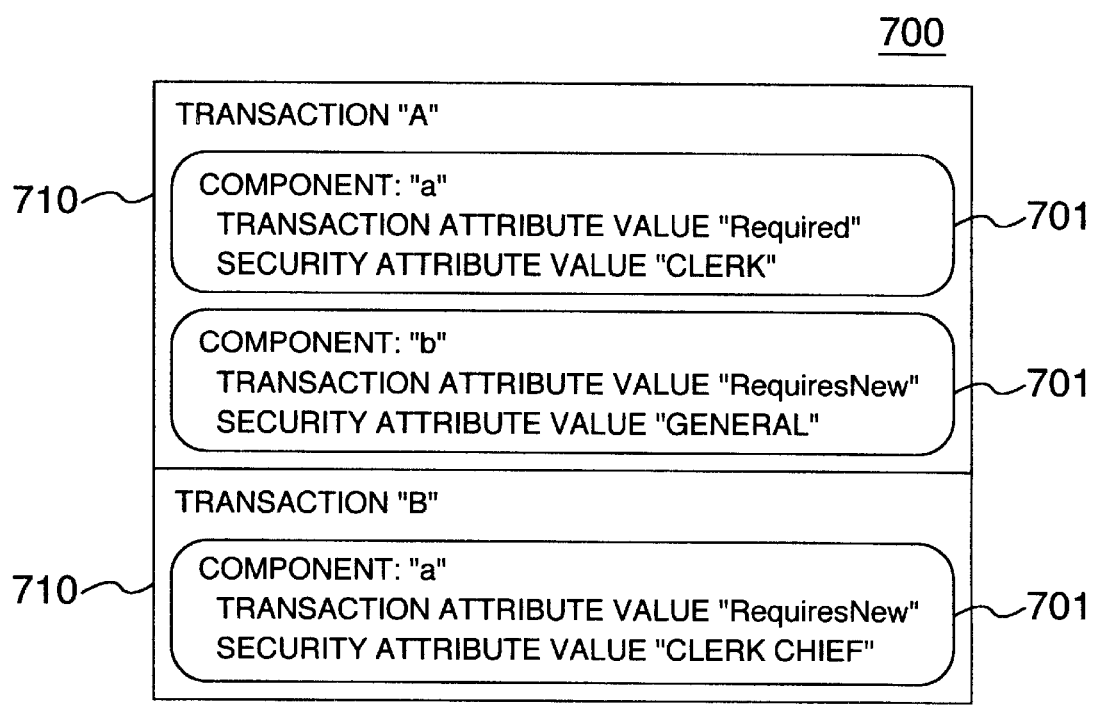
FIG. 7 is a diagram showing the data structure of a definition file in a third embodiment of the present invention.

FIG. 7 shows the data structure of a definition file 700 for holding attribute values corresponding to transaction identifying information and component names. The definition file 700 has a plurality of regions 710 each for holding information peculiar to a transaction. Each of the regions 710 has a plurality of areas 701 each for holding transaction identifying information and information peculiar to a component. Each of the areas 701 has a component name, and an attribute value indicating a component control method. The attribute value indicating a component control method may contain an attribute value concerning transaction control, and an attribute value concerning security management. Alternatively, the attribute value may contain any other information indicating a component control method.

Before the operation of the system starts, a system constructor stores the definition file 700 in the external storage device 601. The container 100 acquires information from the definition file 700 stored in the external storage device 601 and generates table data 130. The procedure is as follows. A region 710 for holding information peculiar to a transaction is acquired from the definition file 700. Transaction identifying information is acquired from the region 710 and written in a field of transaction identifying information. An area 701 for holding information peculiar to a component is acquired from the region 710. A component name is acquired from the area 701 and written in a field of component name. If some area 701 not yet processed remains in the region 710, the aforementioned process is repeated. If some region 710 not yet processed remains in the file 700, the process is further repeated.

Owing to the provision of the definition file as described above, the container can acquire transaction identifying information for identifying a transaction to be executed by a transaction program and an attribute value indicating a component control method corresponding to the name of a component to be used by the transaction program.

Assume now a definition file having a plurality of regions each as a region for holding transaction identifying information and attribute values peculiar to a transaction, and a plurality of areas each as an area for holding a component name peculiar to a component. If the definition file having such a data structure is used, transaction identifying information for identifying a transaction to be executed by a transaction program and an attribute value indicating a component control method corresponding to the name of a component to be used by the transaction program can be given to the container.

The theory of the way of acquiring transaction identifying information by use of a component alias will be described on the basis of a fourth embodiment of the present invention.

In the background art, when it is difficult to correct a transaction program, the transaction program cannot supply transaction identifying information to the container. This problem is solved by the fourth embodiment of the present invention.

Figure 8:
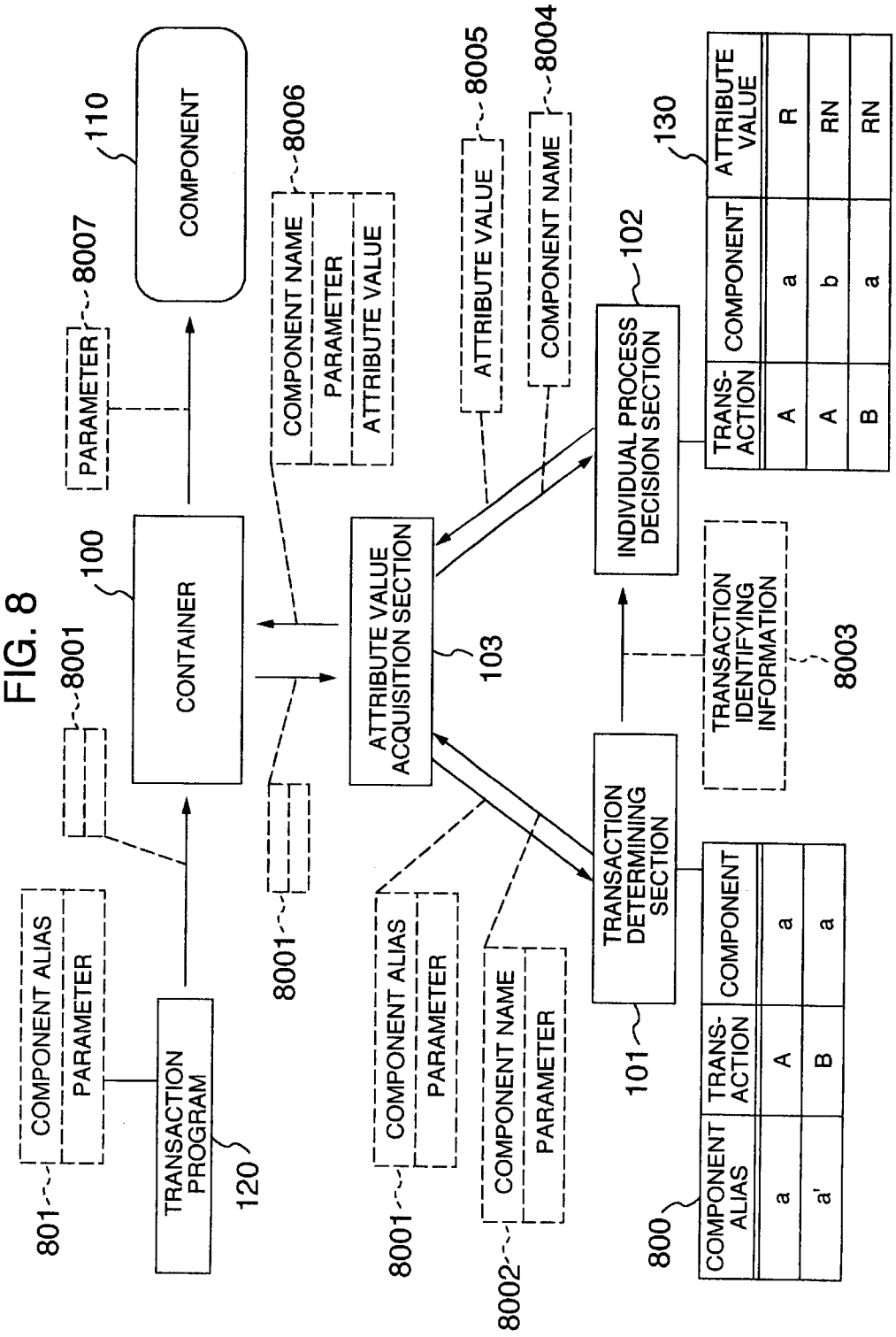
FIG. 8 is a data flow chart showing the theory of a fourth embodiment of the present invention.

FIG. 8 is a data flow chart showing the theory of an enterprise information system to which the fourth embodiment is applied. The container 100 is a program for controlling a component 110. The component 110 is a program to be used by a transaction program 120. The transaction program 120 is a program for performing a transaction in the enterprise information system. The transaction program 120 has data 801 containing a component alias (inclusive of the name of a method to be used) corresponding to a component 110 to be used, and a parameter for using the component 110. The transaction determining section 101 is a program for acquiring transaction identifying information for identifying a transaction. The transaction determining section 101 has table data 800. The table data 800 has records each containing a field for holding a component alias as described above, a field for holding transaction identifying information for identifying a transaction to be executed by a transaction program, and a field for holding a component name used actually. The individual process decision section 102 is a program for deciding an attribute value indicating a component control method corresponding to the transaction identifying information and the component name. The individual process decision section 102 has table data 130 having records each containing a field for holding transaction identifying information as described above, a field for holding a component name as described above, and a field for holding an attribute value as described above. The attribute value acquisition section 103 is a program used by the container 100 for acquiring the attribute value. Component alias/parameter 8001 is data supplied from the transaction program 120 to the container 100 and further supplied from the container 100 to the transaction determining section 101 through the attribute value acquisition section 103. Component name/parameter 8002 is data supplied from the transaction determining section 101 to the attribute value acquisition section 103. Transaction identifying information 8003 is data supplied from the transaction determining section 101 to the individual process decision section 102. Component name 8004 is data supplied from the attribute value acquisition section 103 to the individual process decision section 102. Attribute value 8005 is data supplied from the individual process decision section 102 to the attribute value acquisition section 103. Component name/parameter/attribute value 8006 is data supplied from the attribute value acquisition section 103 to the container 100. Parameter 8007 is data supplied from the container 100 to the component 110.

A flow of processing in the fourth embodiment will be described below. When a system user starts use of a transaction program 120, the transaction program 120 supplies the container 100 with data 801 containing a component alias (inclusive of a method name) corresponding to a component 110 to be used, and a parameter for using the component 110. The container 100 supplies component alias/parameter 8001 to the attribute value acquisition section 103. The attribute value acquisition section 103 acquires a component name and an attribute value indicating a component control method by using the transaction determining section 101 and the individual process decision section 102. The attribute value acquisition section 103 supplies component name/parameter/attribute value 8006 to the container 100. The container 100 carries out a process in accordance with the input attribute value. The container 100 supplies parameter 8007 to the component 110 corresponding to the component name. Upon reception of the parameter 8007, the component 110 carries out a process.

Processing in the transaction determining section 101 is different from that in the first embodiment. A flow of processing in the transaction determining section 101 will be described below. The transaction determining section 101 receives component alias/parameter 8001 from the attribute value acquisition section 103. The transaction determining section 101 searches the table data 800 for a record having a component alias coincident with the received component alias. The transaction determining section 101 acquires transaction identifying information from the retrieved record and supplies the transaction identifying information to the individual process decision section 102. The transaction determining section 101 acquires component name/parameter 8002 to be used actually from the retrieved record and supplies the component name/parameter 8002 to the attribute value acquisition section 103.

Processing in the individual process decision section 102 and the attribute value acquisition section 103 is the same as that in the first embodiment.

By use of the aforementioned processing, the attribute value indicating a method for controlling the component 110 can be changed only if the transaction program 120 outputs the component alias used in each transaction even if the program 120 does not output any transaction identifying information specifically. It is generally easy to change the component name held and used in the transaction program. In most cases, the component name can be provided from the outside (through a definition file, or the like). Hence, this embodiment can be carried out by using transaction programs provided in the background art without any change or with only a small change of the transaction programs. Hence, a component can be used in common to transaction programs requiring different attribute values respectively.

The theory of the way of changing the attribute value by use of a component alias will be described on the basis of a fifth embodiment of the present invention.

In the background art, when it is difficult to correct the descriptive format of a definition file, transaction identifying information for identifying a transaction cannot be held in the definition file. This problem is solved by the fifth embodiment.

Figure 9:
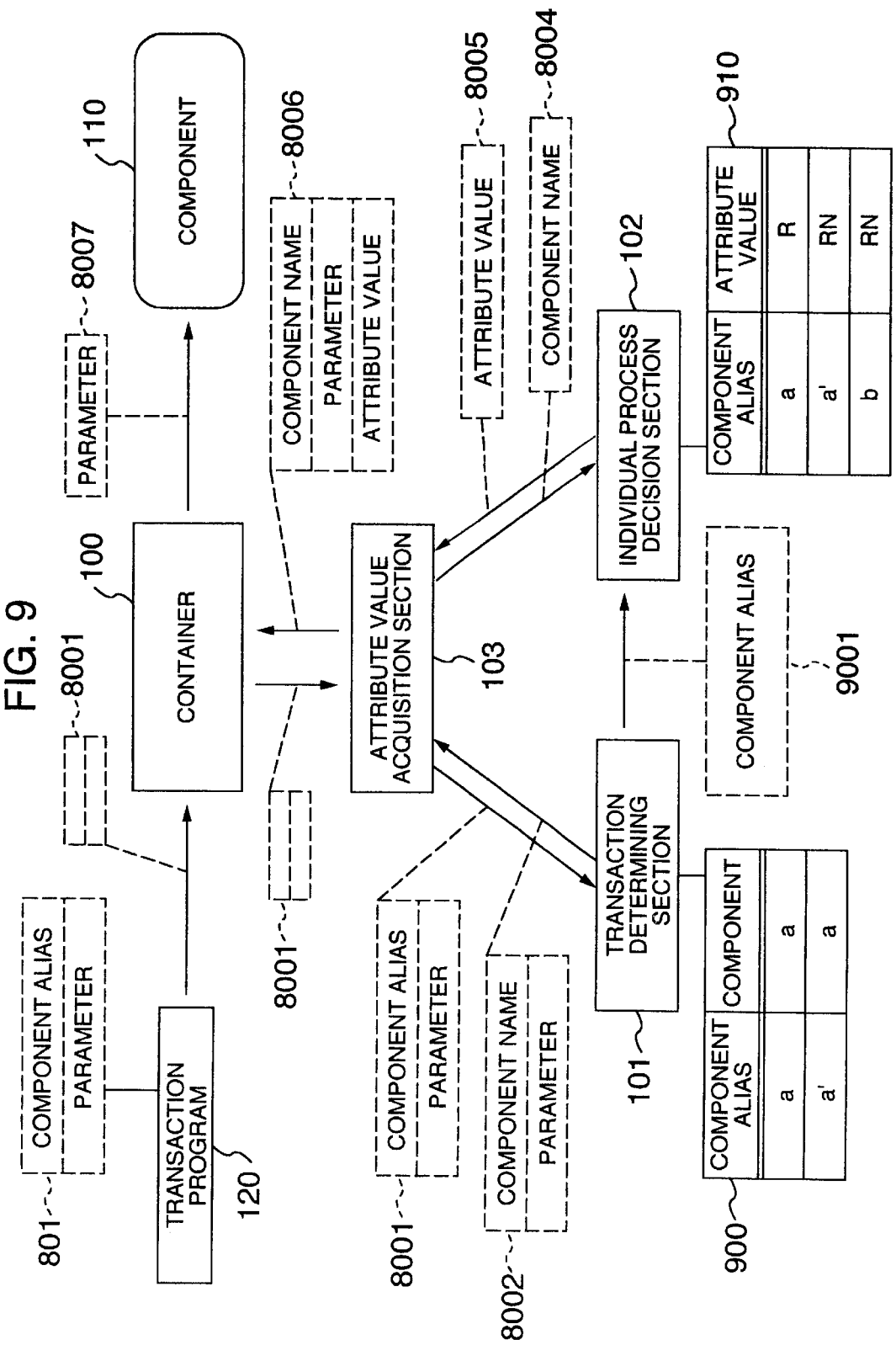
FIG. 9 is a data flow chart showing the theory of a fifth embodiment of the present invention.

FIG. 9 is a data flow chart showing the theory of an enterprise information system according to the fifth embodiment. A container 100 is a program for controlling a component 110. The component 110 is a program to be used by a transaction program 120. The transaction program 120 is a program for performing a transaction in the enterprise information system. The transaction program 120 has data 801 containing a component alias (inclusive of the name of a method to be used) corresponding to a component 110 to be used, and a parameter for using the component 110. The transaction determining section 101 is a program for acquiring a component alias to thereby determine a transaction.

The transaction determining section 101 has table data 900 having records each containing a field for holding a component alias as described above, and a field for holding a component name used actually. The individual process decision section 102 is a program for deciding an attribute value indicating a component control method corresponding to the component alias. The individual process decision section 102 has table data 910 having records each containing a field for holding a component alias as described above, and a field for holding an attribute value as described above. The attribute value acquisition section 103 is a program to be used by the container 100 for acquiring the attribute value. Component alias/parameter 8001 is data supplied from the transaction program 120 to the container 100 and further supplied from the container 100 to the transaction determining section 101 through the attribute value acquisition section 103. Component name/parameter 8002 is data supplied from the transaction determining section 101 to the attribute value acquisition section 103. Component alias 9001 is data supplied from the transaction determining section 101 to the individual process decision section 102. Component name 8004 is data supplied from the attribute value acquisition section 103 to the individual process decision section 102. Attribute value 8005 is data supplied from the individual process decision section 102 to the attribute value acquisition section 103. Component name/parameter/attribute value 8006 is data supplied from the attribute value acquisition section 103 to the container 100. Parameter 8007 is data supplied from the container 100 to the component 110.

A flow of processing in the fifth embodiment is substantially the same as that in the fourth embodiment except processing in the transaction determining section 101 and the individual process decision section 102.

A flow of processing in the transaction determining section 101 will be described below. The transaction determining section 101 receives component alias/parameter 8001 from the attribute value acquisition section 103. The transaction determining section 101 searches the table data 900 for a record having a component alias coincident with the received component alias. The transaction determining section 101 acquires the component alias from the retrieved record and supplies it as component alias 9001 to the individual process decision section 102. The transaction determining section 101 acquires component name/parameter 8002 from the retrieved record and supplies it to the attribute value acquisition section 103.

A flow of processing in the individual process decision section 102 will be described below. The individual process decision section 102 receives component alias 9001 from the transaction determining section 101. The individual process decision section 102 receives component name 8004 from the attribute value acquisition section 103. The individual process decision section 102 searches the table data 910 for a record having a component alias coincident with the received component alias. The individual process decision section 102 acquires an attribute value indicating a component control method from the retrieved record and supplies it as attribute value 8005 to the attribute value acquisition section 103.

By use of the aforementioned processing, similarly to the fourth embodiment, the attribute value indicating a method for controlling the component 110 can be changed only if the transaction program 120 outputs the component alias used in each transaction even if the program 120 does not output any transaction identifying information specifically. Moreover, the descriptive format of a definition file as used in the background art can be used directly because information of the same format as that in the background art is held in the table data 910. Hence, the definition file provided in the background art can be reused, so that this embodiment can be carried out with a smaller quantity of correction than that in the fourth embodiment. Hence, a component can be easily used in common to transaction programs requiring different attribute values respectively.

The use of the program control program according to the present invention permits the attribute value indicating a component control method to be changed in accordance with the kind of the transaction.

What is claimed is:

1. A program control method comprising the steps of:
    holding transaction identifying information for identifying a transaction to be executed by a transaction program, a component name for specifying a component to receive data from said transaction program, and an attribute value indicating a method for controlling said component while correspondingly associating them with one another;
    inputting data containing component name, parameter to be sent to a component corresponding to said component name and transaction identifying information; and
    controlling said component corresponding to said input component name on the basis of said input transaction identifying information and said held attribute value corresponding to said input component name to thereby output said input parameter into said component.

2. A program control method according to claim 1, wherein said attribute value is a value indicating the fact that transaction control is provided.

3. A program control method according to claim 1, wherein said attribute value is a value indicating the fact that transaction control is not provided.

4. A program control method according to claim 1, wherein said attribute value is a value indicating the fact that a new transaction is provided additionally to start if there is no transaction added when the component is used.

5. A program control method according to claim 1, wherein said attribute value is a value indicating the fact that a new transaction is always provided additionally to start when the component is used.

6. A program control method according to claim 1, wherein said attribute value is a value indicating the fact that process is terminated abnormally if there is no transaction added when the component is used.

7. A program control method according to claim 1, wherein said attribute value is a value indicating the fact that process is terminated abnormally if there is some transaction added when the component is used.

8. A program control method comprising the steps of:
    holding transaction identifying information for identifying a transaction to be executed by a transaction program, one of component aliases corresponding to a component to receive data from said transaction program and a component name for specifying said component while correspondingly associating them with one another;
    holding an attribute value indicating a method for controlling said component while correspondingly associating said attribute value with said transaction identifying information and said component name;
    inputting data containing said component alias and parameter as an input to the component;
    acquiring said held transaction identifying information and said held component name corresponding to said input component alias; and controlling said component corresponding to said component name on the basis of said acquired transaction identifying information and said held attribute value corresponding to said acquired component name to thereby output said input parameter into said component.

9. A program control method comprising the steps of:

holding one of component aliases corresponding to a component to receive data from a transaction program and a component name for specifying said component univocally while correspondingly associating them with each other;

holding an attribute value indicating a method for controlling said component while correspondingly associating said attribute value with said component alias;

inputting data containing said component alias and parameter to be supplied to the component;

acquiring said held component name corresponding to said input component alias; and controlling said component corresponding to said acquired component name on the basis of said held attribute value corresponding to said input component alias to thereby output said input parameter into said component.

10. A program control system comprising:

a storage device including a table for storing transaction identifying information for identifying a transaction to be executed by a transaction program, a component name for specifying a component to receive data from said transaction program, and an attribute value for indicating a method for controlling said component while correspondingly associating them with one another; and a control means for receiving data containing component name, parameter to be supplied to said component corresponding to said component name and transaction identifying information and controlling said component corresponding to said input component name on the basis of said input transaction identifying information and said stored attribute value corresponding to said input component name to thereby output said input parameter to said component.

11. A program control system including a storage medium with instructions stored therein, the instructions when executed causing the program control system to perform:

storing transaction identifying information to be executed by a transaction program, a component name for specifying a component to receive data from said transaction program, and an attribute value for indicating a method for controlling said component; and receiving data containing component name, parameter to be supplied to a component corresponding to said component name and transaction identifying information and controlling said component corresponding to said input component name on the basis of said input transaction identifying information and said stored attribute value corresponding to said input component name to thereby output said input parameter into said component.

12. A computer including a storage medium with instructions stored therein, the instructions when executed causing the computer to perform:

storing transaction identifying information for identifying a transaction to be executed by a transaction program, a component name for specifying a component to receive data from said transaction program, and an attribute value for indicating a method for controlling said component; and receiving data containing component name, parameter to be supplied to a component corresponding to said component name and transaction identifying information and controlling said component corresponding to said input component name on the basis of said input transaction identifying information and said stored attribute value corresponding to said input component name to thereby output said input parameter into said component.

* * * * *